(No Model.)
H. H. CUMMINGS.
METHOD OF MAKING LACING HOOKS.
No. 546,641. Patented Sept. 17, 1895.
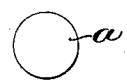  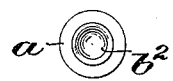
Fig. 1.     Fig. 3.     Fig. 5.
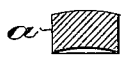 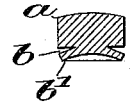 
Fig. 2.     Fig. 4.     Fig. 6.
 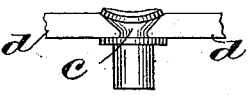 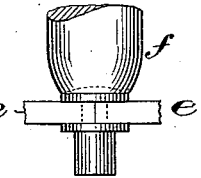
Fig. 7.     Fig. 9.     Fig. 10.
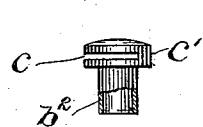 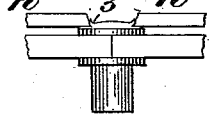 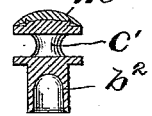
Fig. 8.     Fig. 11.     Fig. 12.
Fig. 13.
Witnesses.
Edward F. Allen.
Thomas F. Drummond.
Inventor.
Henry H. Cummings.
by Crosby & Gregory
attys.

UNITED STATES PATENT OFFICE.

HENRY H. CUMMINGS, OF MALDEN, MASSACHUSETTS, ASSIGNOR TO THE REVERSIBLE RIVET COMPANY, OF PORTLAND, MAINE.

METHOD OF MAKING LACING-HOOKS.

SPECIFICATION forming part of Letters Patent No. 546,641, dated September 17, 1895.

Application filed October 4, 1894. Serial No. 524,881. (No model.)

*To all whom it may concern:*

Be it known that I, HENRY H. CUMMINGS, of Malden, county of Middlesex, State of Massachusetts, have invented an Improvement in Methods of Making Lacing-Hooks, of which the following description, in connection with the accompanying drawings, is a specification, like letters on the drawings representing like parts.

In accordance with my invention the lacing-hook is made from a substantially circular or disk-shaped blank, which is cut into circumferentially near one end, then rolled and spun to form at one side of said cut a tubular shank, and the disk is then cut into at its periphery, thus dividing it nearly into two pieces at right angles to the shank, leaving at the periphery of the blank opposite the cut a narrow neck to connect the two parts above and below the latter cut, the neck being then drawn or stretched to farther separate the said parts, stiffen the neck, and constitute of said parts a hook-base and an overhanging hook, and the hook is then swaged into shape, all substantially as will be described.

Figure 1 in top view shows a metal blank suitable for the formation of a lacing-hook; Fig. 2, a section thereof; Fig. 3, an under side view of the blank after having been cut into peripherally; Fig. 4, a section thereof right side up; Fig. 5, an under side view of the blank provided with a tubular shank; Fig. 6, a section thereof right side up. Fig. 7 shows the tubular shank and disk-like top cut partially into two pieces, one to form a hook and the other a hook-base. Fig. 8 is a side elevation thereof, looking toward the left, Fig. 7, the tubular shank being partially broken out. Fig. 9 shows the neck between the hook and hook-base as being elongated or stretched and reduced in diameter and stiffened. Fig. 10 shows the neck as being yet further stretched and the head swaged and finished. Fig. 11 shows the head as being notched or pronged, as when a non-metallic top is desired. Fig. 12 is a longitudinal section of the completed lacing-hook with non-metallic top, and Fig. 13 is a side elevation of the completed hook.

I take a rather thick substantially-circular metallic blank $a$, Figs. 1 and 2, and make in its periphery a circumferential cut near one end, as at $b$, as best shown in Fig. 4, and then while held between a series of diverging dies entering said cut and by rotation of the blank I reduce and draw the part $b'$ to form a tubular shank $b^2$, as best shown in Figs. 5 and 6, this operation being performed substantially as provided for in my United States Patent No. 414,755, dated November 12, 1889. This done, I make a second cut into the periphery of the blank between the shank and the opposite end of the blank, said cut $c$ extending past the center of the blank nearly through the same, the cutting being stopped at the proper time to leave at one edge of the blank a thin short neck $c'$, connecting what is to be the hook $c^2$ and the hook-base $c^3$. A narrow slot $c$ having been formed I force suitable tools $d$ thereinto and attack the neck $c'$, as in Fig. 9, hammering and stretching the same to not only harden and stiffen the neck, but also to thereby farther separate the hook $c^2$ from the hook-base, and thereafter by other swaging tools $e$ the neck is further elongated and reduced in diameter, and a die $f$ is made to strike the head to round or shape it, as in Fig. 10. If, however, the top of the hook is to be finished by the addition of a non-metallic cap, the top of the hook is attacked by suitable sharp-edged or pointed tools $h\ h$, and the metal is turned up to form prongs which serve to retain the non-metallic cap $m$, which may be of leather or any other usual or suitable material, which may be put on by pressure in a die.

Instead of using sharp-edged or pointed tools, as $h\ h$, any other suitable tool may be used to roughen or nick the top of the head to retain the non-metallic cap thereupon when subjected to pressure.

The hereinbefore-described method of making the hook enables me to use metal for the blank, the thickness of which is much less than the length of the finished blank.

The cut $c$ is made very narrow to thus remove as little of the metal as possible and leave a cut by which to obtain access to the neck. In this my invention it will be noticed that the slit $c$ made in the blank is very thin to thus obviate waste of stock, and that the neck $c'$, left for the said cut, is very short, and to lengthen this neck, so as to afford sufficient space between the head and the base or top part of the partially-tubular shank, I act upon and draw or elongate the neck and at the same time toughen the fiber by hammering the same.

A lacing-hook made as described is stronger and may be made more cheaply than the one described in my Patent No. 414,684.

Having described my invention, what I claim as new, and desire to secure by Letters Patent, is—

1. The herein described method of producing a lacing hook from a substantially circular blank, which consists in cutting into the periphery of the blank near one end, spinning the material at one side said cut to form a tubular shank, cutting into the periphery of said blank from one edge past its center, to leave a connecting neck, forging and drawing said neck to elongate the same, and shaping the outer portion of the disk to form a head, substantially as described.

2. The herein described method of producing a lacing hook from a substantially circular blank, which consists in cutting into the periphery of the blank near one end, spinning the material at one side said cut to form a tubular shank, cutting into the periphery of said blank from one edge past its center, to leave a connecting neck, forging and drawing said neck to elongate the same, shaping the outer portion of the disk to form a head, nicking the top of the head, and securing a non-metallic cap to said nicked head, substantially as described.

In testimony whereof I have signed my name to this specification in the presence of two subscribing witnesses.

HENRY H. CUMMINGS.

Witnesses:
JOHN C. EDWARDS,
AUGUSTA E. DEAN.